(12) United States Patent
Okamoto et al.

(10) Patent No.: US 8,306,640 B2
(45) Date of Patent: Nov. 6, 2012

(54) APPARATUS AND METHOD PRODUCT FOR ACCESSING INFORMATION RELATED TO A PARTICULAR SETTING FROM AN INFORMATION REPOSITORY

(75) Inventors: Masayuki Okamoto, Kanagawa-ken (JP); Naoki Iketani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 706 days.

(21) Appl. No.: 12/393,250

(22) Filed: Feb. 26, 2009

(65) Prior Publication Data

US 2009/0281644 A1 Nov. 12, 2009

(30) Foreign Application Priority Data

Feb. 26, 2008 (JP) .................................. 2008-044951
Sep. 26, 2008 (JP) .................................. 2008-248956

(51) Int. Cl.
*G06F 17/00* (2006.01)
(52) U.S. Cl. ............................................... 700/94
(58) Field of Classification Search .................... 700/94; 381/119; 704/500–504; 379/202.01, 204.01; 348/14.06, 14.08
See application file for complete search history.

(56) References Cited

U.S. PATENT DOCUMENTS

| | | | |
|---|---|---|---|
| 6,298,129 B1 * | 10/2001 | Culver et al. | ............ 379/202.01 |
| 7,466,334 B1 * | 12/2008 | Baba | ........................... 348/14.06 |
| 2006/0053194 A1 * | 3/2006 | Schneider et al. | ............ 709/204 |
| 2008/0243494 A1 | 10/2008 | Okamoto et al. | |
| 2008/0244056 A1 | 10/2008 | Okamoto et al. | |

FOREIGN PATENT DOCUMENTS

| | | |
|---|---|---|
| JP | 08-316953 | 11/1996 |
| JP | 2002-251393 | 9/2002 |

OTHER PUBLICATIONS

Fink, Michael, et al; "Social-and Interactive-Television Applications Based on Real-Time Ambient-Audio Identification".
Japanese Office Action for Japanese Application No. 2008-248956 mailed on Jun. 15, 2012.

* cited by examiner

*Primary Examiner* — Andrew C Flanders
(74) *Attorney, Agent, or Firm* — Turocy & Watson, LLP

(57) ABSTRACT

A information presentation apparatus, including a storage unit which stores a first audio data recorded from a certain setting as well as the information related to the setting and an input unit to input a second audio data. An audio data verification unit verifies whether the second audio data contains a part of the first audio data. An extraction unit extracts the information related to the setting associated to the portion of the first audio setting if the second audio data is successfully verified against a portion of the first audio data. The information extracted by the extraction unit is then outputted to the user by an output unit.

21 Claims, 14 Drawing Sheets

| Audio Data | Recording Time | File | Start of Usage | End of Usage |
|---|---|---|---|---|
| Audio1.wav | 20070204 10:00:00 ~ 20070204 15:00:00 | ... | ... | ... |
| | | B.ppt | 20070204 12:00:00 | 20070204 13:03:43 |
| | | C.mpg | 20070204 12:20:00 | 20070204 12:36:40 |
| | | ... | ... | ... |

Fig. 3

| Audio Data | File | User ID |
|---|---|---|
| Audio1.wav | B.avi | Ogawa |
| | C.mpg | Ogawa |
| Audio2.wav | D.jpg | ... |
| | E.mpg | ... |

Fig.8

| Audio Data | Recording Time | File | Start of Usage | End of Usage |
|---|---|---|---|---|
| Meeting1.wav | 20070204 10:00:00 ~ 20070204 15:00:00 | ... | ... | ... |
| | | Project Progress.ppt | 20070204 12:00:00 | 20070204 13:03:43 |
| | | ... | ... | ... |

Fig. 12

(1) Joining the event
(2) Upload after event
(3) Download of special movie upon successful verification
(4) User A passes audio data to User B (preferably audio data with meaning e.g. Emcee Talk etc.)

(5) User B associated with User A upon upload of audio data
(6) The User A-User B association is used later for marketing purposes

| Audio Data | File | User ID |
|---|---|---|
| Emceeintro.wav | Special1.avi | UserA |
| | Special2.mpg | UserA |
| Eventinto.wav | Special3.jpg | ... |
| | Special4.mpg | ... |

Fig. 14

| Audio Data | File | User ID |
|---|---|---|
| Emcee Intro.wav | Special1.avi | UserA-UserB |
| | Special2.mpg | UserA-UserB |
| Event Intro.wav | Special3.jpg | ... |
| | Special4.mpg | ... |

Fig. 15

APPARATUS AND METHOD PRODUCT FOR ACCESSING INFORMATION RELATED TO A PARTICULAR SETTING FROM AN INFORMATION REPOSITORY

CROSS-REFERENCE TO RELATED APPLICATIONS

This application is based upon and claims the benefit of priority from the prior Japanese Patent Application No. 2008-248956 filed on Sep. 26, 2008; the entire contents of which are incorporated herein by reference.

BACKGROUND OF THE INVENTION

1. Field

The present invention relates to an apparatus and a method for acquiring information related to a particular setting from an information repository.

2. Related Art

Usage of audio and visual equipment like recorders, sensors and displays has become increasingly common, giving rise to more opportunities to use electronic information control devices like personal computers. As such, demand is now increasing for these devices to be able to retrieve information used in a particular setting, at a later point in time. It is desirable for this to be done easily by some form of verification or identification.

An information access device in which the user uses an ID and registration to access meeting information is disclosed in the reference, JP-A 2002-251393 (KOKAI).

SUMMARY OF THE INVENTION

To solve the above described problem, the present invention seeks to provide an apparatus or method to access information which is linked to a particular setting without going through the process of registering beforehand.

According to an embodiment of the present invention, there is provided an apparatus of accessing information related to a particular setting, the apparatus including;

a storage unit which stores a first audio data recorded from a certain setting as well as the information related to the setting;

an input unit to input a second audio data;

an audio data verification unit which verifies whether the second audio data contains a part of the first audio data;

an extraction unit which extracts the information related to the setting associated to the portion of the first audio setting if the second audio data is successfully verified against a portion of the first audio data;

an output unit which outputs the information extracted by the extraction unit to the user.

BRIEF DESCRIPTION OF THE DRAWINGS

The accompanying drawings, which are incorporated in and constitute a part of the specifications, illustrate presently preferred embodiments of the invention, and together with the general description given above and the detailed description of the preferred embodiments given below, serve to explain the principles of the invention.

FIG. 3 is a diagram illustrating an example of the data stored inside the storage unit 104 as shown in FIG. 1.

FIG. 8 is a diagram illustrating an example of the special information associated with the stored data.

FIG. 12 is a diagram illustrating an example of the data stored inside the storage unit 104 as shown in FIG. 11.

FIG. 14 is a diagram illustrating an example of the data stored inside the storage unit 104 as shown in FIG. 13.

FIG. 15 is a diagram illustrating an example of the data stored inside the storage unit 104 after user to user association is created as shown in FIG. 13.

DETAILED DESCRIPTION OF THE INVENTION

The embodiment of the present invention is described below with reference to the attached drawings.

FIGS. 1 to 5 describes the first embodiment of the present invention. In the first embodiment of this invention, the information presentation apparatus 100 is used and the audio data of the meeting is stored in the storage unit as stored data. The information used on personal computer 300 (hereafter known as PC 300) is associated with the current setting.

Figure 1:
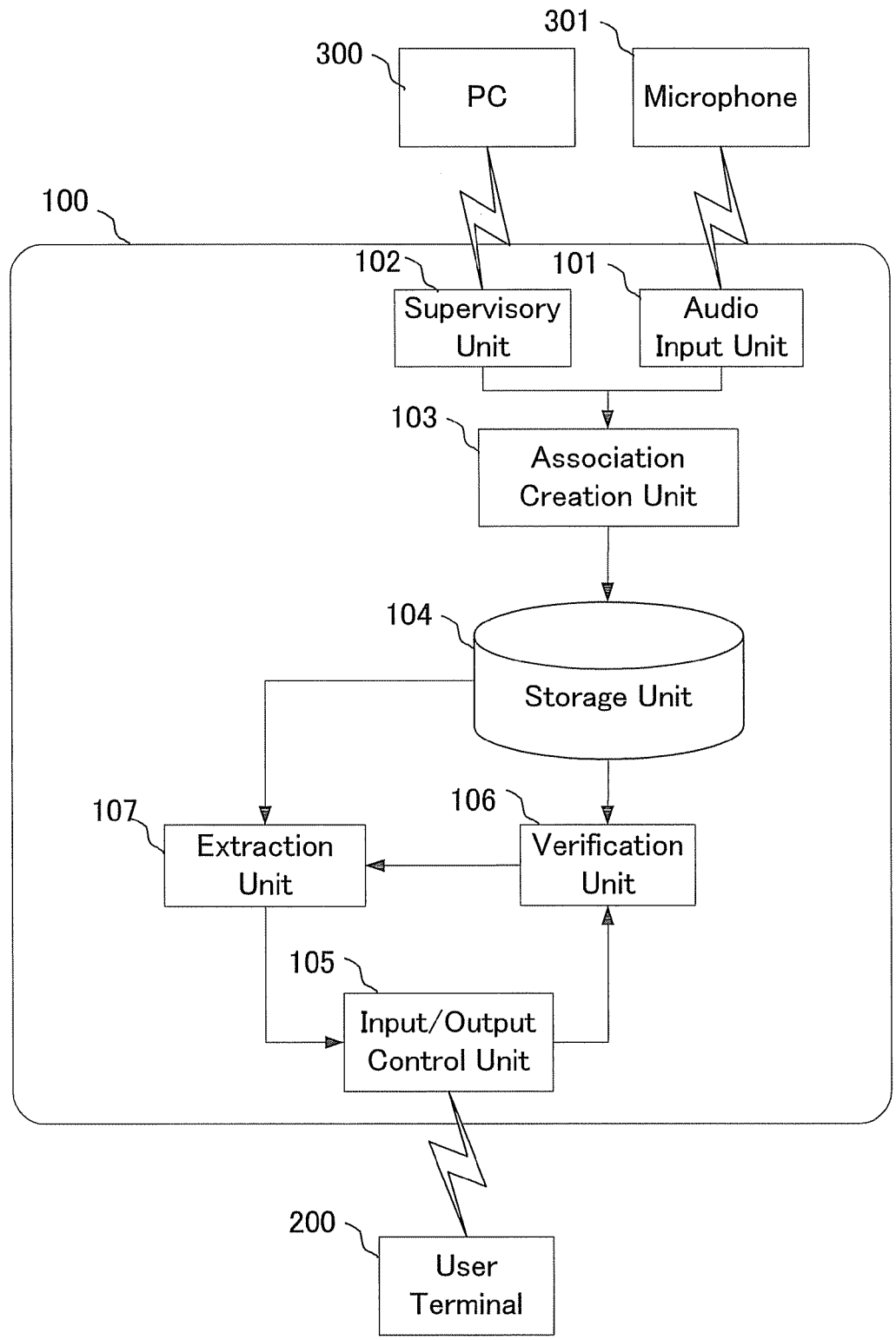
FIG. 1 is a functional block diagram illustrating a first embodiment of the information accessing apparatus of the present invention.

FIG. 1 shows the functional block diagram of the first embodiment of the information accessing apparatus of the present invention. The information presentation apparatus 100 includes; a audio input unit 101 for the input of meeting audio data obtained from mic 301, a supervisory unit 102 for supervising the files in use on PC 300 and a correspondence creation unit 103 for creating the corresponding links between the audio data inputs from audio input unit 101 and the files used in the meeting on PC 300. The audio data from the start to the end of the meeting as well as the files used in the meeting are stored in storage unit 104. Any user attending the meeting would use a user terminal 200 to record a suitable portion of the meetings' audio data.

The audio data recorded by the user terminal 200 during the meeting is used when a user who is present at the meeting wishes to retrieve files used in the meeting at a later point in time.

User terminal 200, mic 300 and PC 300 can all be individually linked by wired or wireless means, via a network, to information presentation apparatus 100 for the input or output of files.

The information presentation apparatus 100 receives audio data from the user terminal 200 via input/output control unit 105. The received audio data is then sent to verification unit 106 to be verified against stored data in storage unit 104. If verification unit 106 successfully verifies the audio data received from user terminal 200 against a portion of the stored data in storage unit 104, a command would be sent to extraction unit 107. Extraction unit 107 would then extract the relevant files used in the meeting as verified by verification unit 106. The relevant extracted files would then be sent to user terminal 200 via input/output control unit 105.

Following is a detailed explanation on FIG. 1. Users attending a specific meeting would record audio data from the meeting by using user terminal 200. User terminal 200 would preferably be a mobile handheld device capable of recording audio data like a notebook or mobile phone.

At the same time, the information presentation apparatus 100 would be recording the same audio data as user terminal 200 for verification purposes. The meeting audio data obtained by mic 301 would be sent to the information presentation apparatus 100 by the audio input unit to be stored in storage unit 104. At this point in time, the correspondence creation unit would append chronological information to the audio data inputs. Chronological data need not be the exact precise time; it can be the local time on the information presentation apparatus 100.

The supervisory unit 102 would also be supervising the usage status of PC 300 in the meeting room and detecting the files used on PC 300. Files which have been detected by supervisory unit 102 would be sent to storage unit 104 to be stored. Chronological information about the time period during which the file is being used would also be appended to the file by association creation unit 103 and stored in storage unit 104. This chronological information is stored so as to enable the retrieval of files used on PC 300 in the event that there is a portion of the audio data recorded by the user terminal which can be verified with the audio data stored in storage unit 104.

The input/output control unit 105 would request for inputs to be made to information presentation apparatus 100 for the verification of the user by audio data if it detects a request for a file entry from user terminal 200. The audio data stored in user terminal 200 would then be entered into the information presentation apparatus 100 via the input/output control unit 105.

The verification unit 106 would carry out verification of the audio data recorded by user terminal 200 and obtained from input/output control unit 105 against the stored data in storage unit 104.

The extraction unit 107 would extract the files corresponding to the time frames verified by verification unit 106. These extracted files would then be outputted to user terminal 200 via input/output control terminal 105. The verification process would be explained in detail later.

Next, the process of creating the association between the setting information and the audio file would be explained in detail.

Figure 2:
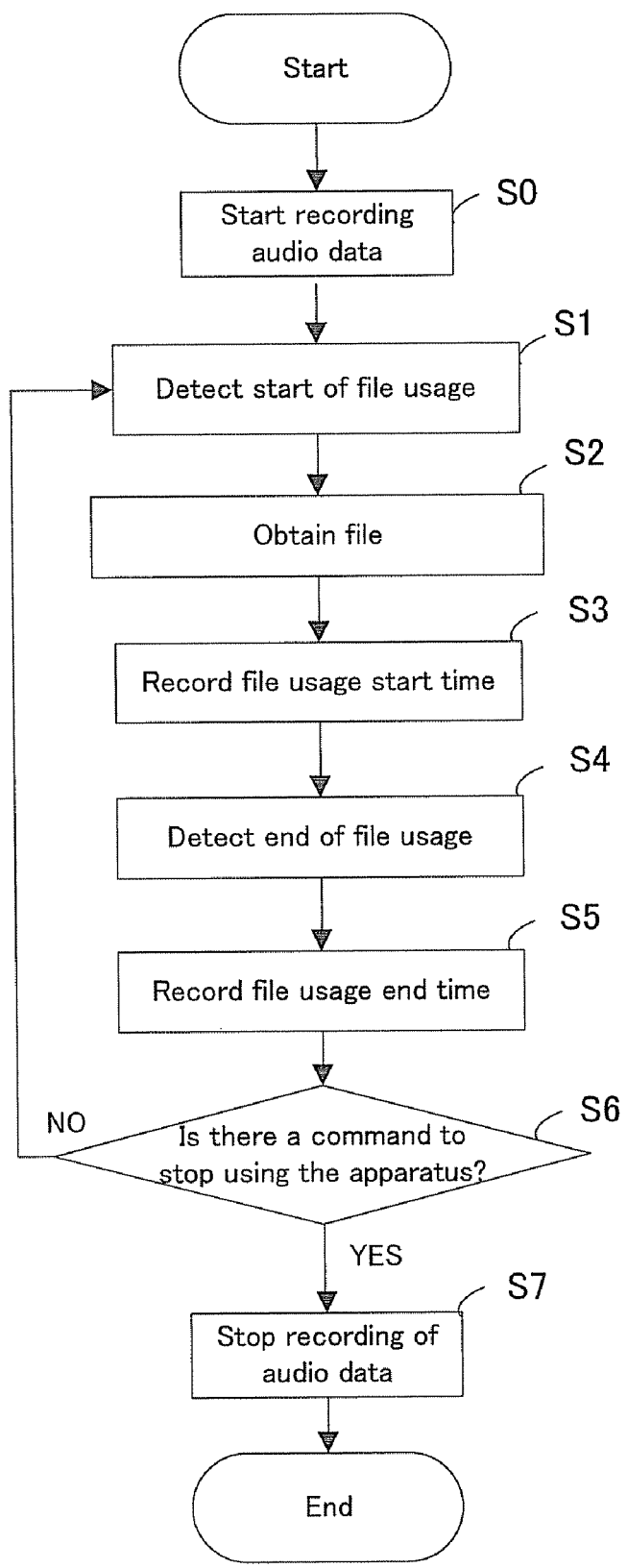
FIG. 2 is a diagram illustrating the flow of the file and audio data storage method as shown in FIG. 1.

FIG. 2 is a flowchart showing the process by which information presentation apparatus 100 creates and stores the association between the files used on PC 300 and the audio data.

Audio input unit 101 would start recording audio data when the meeting begins and the information presentation apparatus is started up (S0). The audio file would be associated with the local time of the information presentation apparatus 100 before it is stored in the storage unit 104.

Next, the supervisory unit 102 would start supervising PC 300. A check would be carried out to detect if there are any files being used on PC 300 (S1). The file in use would then be obtained and stored in storage unit 104 (S2). At the same time, supervisory unit 102 would obtain the file usage start time based on the local time within the information presentation device 100.

The association creation unit 103 would then store the file usage start time obtained in step S2 in storage unit 104 (S3). When the supervisory unit detects that the usage of the file has ended (S4), it would obtain the file usage end time based on the local time within the information presentation unit 100.

The association creation unit 103 would then store the file usage end time obtained in step S3 in storage unit 104 (S5). If a command given by the user to stop using the apparatus is detected by the information presentation apparatus (S6), all recording of audio data by mic 301 or audio input unit 101 would be stopped (S7). The command to stop would be input to PC 300 by the user terminal 200.

FIG. 3 illustrates an example of the audio data created by the above method that is stored in storage unit 104 as well as the file usage time information of the files used in the meeting.

The audio data obtained by mic 301 and audio input unit 101 is stored in storage unit 104. In the case of FIG. 3, the audio data is represented by Audio1.wav. The audio data file name is created by the association creation unit 103.

The recording start and end times of Audio1.wav is also associated to the audio data and stored. Other information such as the files used in the meeting during which Audio1.wav was recorded and the file usage time frame are also stored along with the audio data. For example, usage of the file B.ppt started on PC 300 from 20070204 12:00:00 and ended on 20070204 13:03:43. As this time frame is within the recording period of Audio1.wav, presentation of the B.ppt to the user of user terminal 200 would be made possible.

It is also possible for the audio data stored in storage unit 104 to be partitioned according the each individual meeting. In such a case, it would also be possible to associate and store information like the name of the meeting and location, etc.

In step S2, it is possible for the usage status of the files used on PC 300 to be obtained and stored in storage unit 104 without storing the files themselves. In this case, only the information needed for the retrieval of the files (e.g. path of file on network, etc.) would be obtained and stored in storage unit 104.

Figure 4:
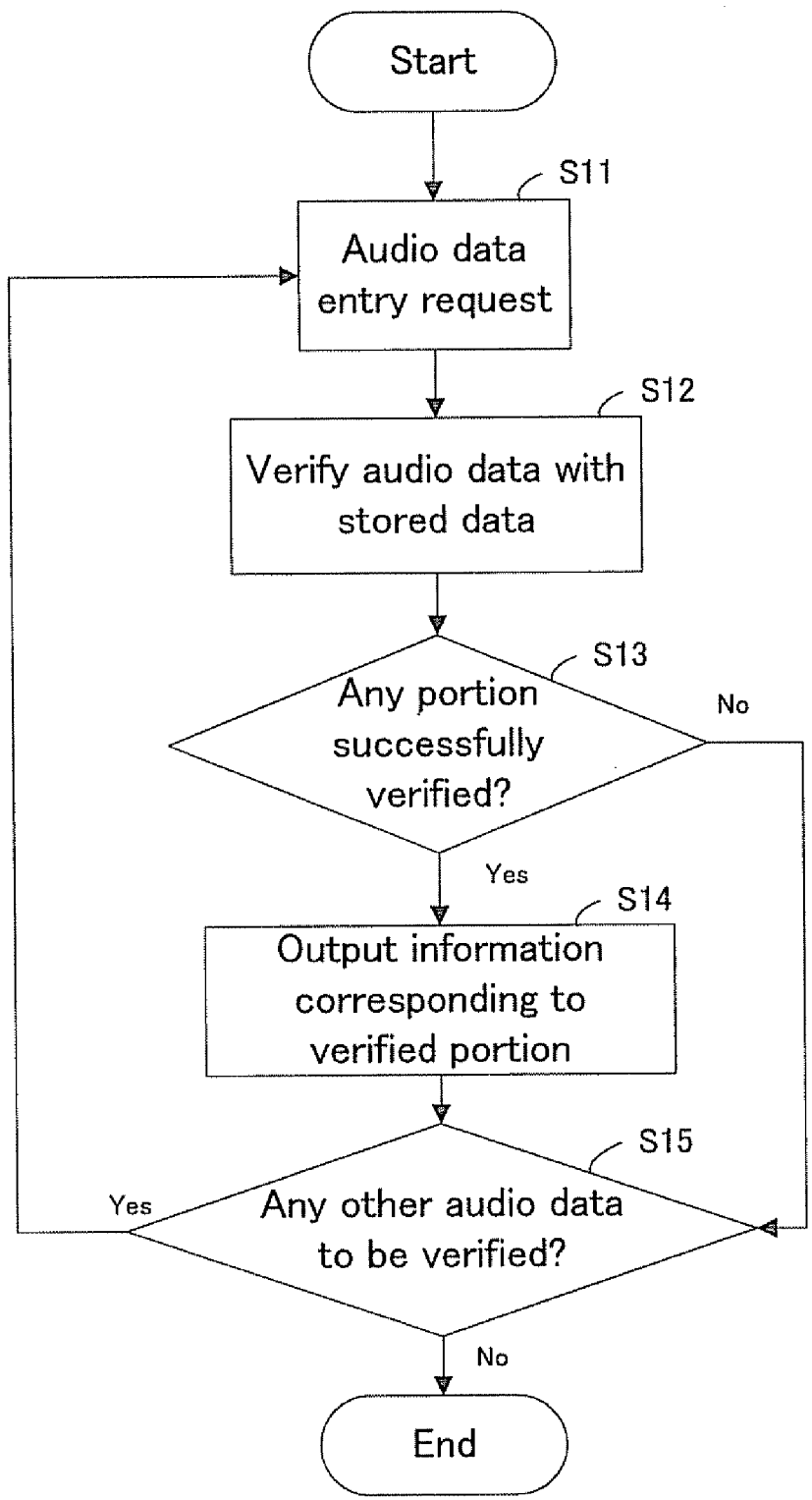
FIG. 4 is a diagram illustrating the flow of the user verification process as shown in FIG. 1.

FIG. 4 is a flowchart showing the overall flow of verifying an audio data input from user terminal 200 with the stored data in storage unit 104, whereupon a successful verification, the corresponding files would be outputted.

The input/output control unit 105 first requests user terminal 200 to enter audio data for verification (S11). The verification unit 106 would then proceed to verify the audio data input with the stored data within the storage unit 104 (S12). A check is then carried out for any successfully verified portions and the time frames verified would be extracted (S13). In the event of a successful verification, information in the form of files corresponding to the portion successfully verified would be outputted (S14). A check is then carried out for any other pieces of audio data to be verified (S15). If no such audio data is found, the process is ended.

Figure 5:
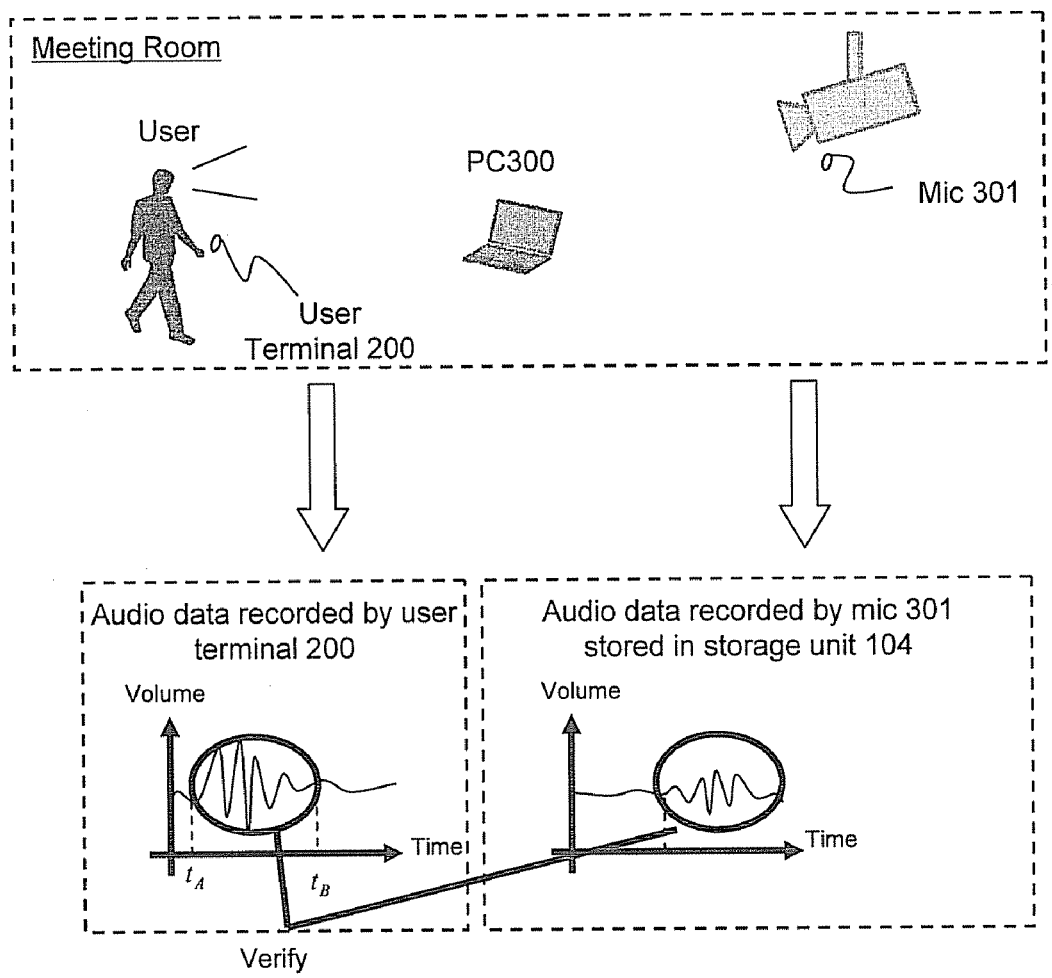
FIG. 5 is a diagram illustrating the actions taken by user terminal 200 and mic 301 as shown in FIG. 1.

The verification method used to verify the audio data inputted to verification unit 106 with the stored data in storage unit 104 as shown in step 12 is explained in FIG. 5.

The upper image of FIG. 5 shows the actual usage setting of the present invention. The lower image of FIG. 5 is a conceptual rendering of the verification process carried out on the stored data of information presentation apparatus 100 and audio data stored in user terminal 200.

As shown in FIG. 5, there is an ongoing meeting. The user attending the meeting brings along a user terminal 200 with recording capabilities along with him into the meeting to record the meeting audio data. On the location setting side of things (in this case, the location setting refers to the meeting room), a mic 301 is also set up to carry out recording of meeting audio data. It must be noted that the audio data recording is carried out separately by both mic 301 and user terminal 200.

The audio data recorded by mic 301 would be stored in storage unit 104 along with its chronological information. Also, files used on PC 300 would be stored in storage unit 104 and its chronological information regarding its usage times would be appended to it.

Due to the user terminal 200 and mic 301 being in different positions when recording is carried out, deterioration of audio signals due to distance from audio source, audio entry angle differences or mic characteristics, the audio data recorded by user terminal 200 and information presentation apparatus 100 may not be exactly the same.

However, as user terminal 200 and information presentation apparatus 100 are recording audio data from the same meeting, there will be some correlation between the recordings. As such, it would be possible to determine, by audio data verification, if the audio data recorded by both the user terminal 200 and information presentation apparatus 100 represent the same meeting.

If the verification process yields a correlation value for the two pieces of audio data that is above a certain threshold value, the user possessing the verified audio data would be deemed as having attended the meeting in question. The files used on PC 300 during the successfully verified portion would then be outputted to the user. The user would then be in possession of the files used during the meeting he attended earlier.

Next, the mutual correlation would be used for the calculation of the correlation value. The stored data in storage unit 104 is taken to be a function f(t) while the audio data stored by user terminal 200 is taken to be a function g(t). If g(t) is slower than f(t) by m(seconds), the correlation degree would be checked for the duration of N and the correlation degree $C_{fl}(m)$ would be calculated as shown below.

First, the average values of all audio data, $f_{ave}$ and $g_{ave}$, for duration N would be calculated as shown in Formula 1.

$$f_{ave} = (1/N)\sum_{t=0}^{N-1} f(t), \quad g_{ave} = (1/N)\sum_{t=0}^{N+m-1} g(t) \quad \text{(Formula 1)}$$

Next, the values attenuated by the calculated average values would be given by $f'(t)=f(t)-f_{ave}$ and $g'(t)=g(t)-g_{ave}$. The correlation degree $C_{fl}(m)$ would then be calculated by Formula 2.

$$C_{fl}(m) = (1/N)\sum_{t=0}^{N-1} N - 1 = f(t)g'(t+m) \quad \text{(Formula 2)}$$

Finally, the normalized correlation degree $R_{fl}(m)=C_{fl}(m)/(\sqrt{C_{fl}(0)}\sqrt{C_{gg}(0)})$ would be used. The values of $C_{ff}$ and $C_{gg}$ would be calculated as shown in Formula 3.

$$C_{ff}(0) = (1/N)\sum_{t=0}^{N-1} f'(t), \quad C_{gg}(0) = (1/N)\sum_{t=0}^{N+m-1} g'(t) \quad \text{(Formula 3)}$$

If the duration N is 5 seconds, m would be calculated to maximise the value of $R_{fl}(m)$. If the value of $R_{fl}(m)$ were to be 0.5 or greater, the audio data recorded by both the user terminal 200 and mic 301 would be deemed to be the same. The above is just one of many possible verification methods and is not meant to be limitative.

As mentioned above, the data stored in storage unit 104 and the audio data audio data entered by user terminal 200 may not necessarily be the same. As such, it would not be necessary for the entire audio file to be matched fully to the stored data. For example, for every one minute interval, as long as verification unit 106 is able to obtain a verification of 80% of the interval can be obtained, the entire block of one minute can be deemed as being successfully verified.

If the audio data from user terminal 200 has been successfully verified with the stored data of storage unit 104 by the verification unit 106, extraction unit 107 would extract the files associated with the verified portion from storage unit 104. The extracted files would then be outputted to user terminal 200 via input/output control unit 105.

In this present embodiment, files are outputted to user terminal 200 upon a successful verification. However, it is also possible to just provide information related to the files (e.g. path of file on network, etc.) instead of the files themselves.

To help the verification process, it is also possible for PC 300 to emit a piece of synchronous audio data. This synchronous audio data would have some unique audio characteristics that can be changed as needed. As this synchronous audio data is emitted during the meeting, both user terminal 200 and mic 300 would be able to record it.

When verification is carried out by verification unit 106, the synchronous audio data would be extracted from both PC 300, which emits the synchronous audio data, and user terminal 200, which records the synchronous audio data. The synchronous audio data would then be used to help synchronise the audio data of user terminal 200 with the stored data of storage unit 104 by using the time during which the synchronous audio data is emitted. Verification of the audio data recorded by user terminal 200 with the stored data of storage unit 104 would be made easier after synchronisation is done.

It is also possible to use audio data with unique characteristics which have been determined by the local time of the information presentation apparatus 100 at the time of output of synchronous audio data. Verification unit 106 would first extract the synchronous audio data from user terminal 200 before obtaining the chronological information which has been embedded in it. The extracted chronological information as well as the chronological information stored within storage unit 104 would be used as the basis for synchronisation of the time of synchronous audio data recording by user terminal 200 with the time of synchronous audio data output by PC 300. Verification of the audio data recorded by user terminal 200 with the stored data of storage unit 104 would be made easier after this is done.

The synchronous audio data can be within or outside of the normal human hearing range.

The association between the files and audio data is stored with the audio data having an offset given by the audio data recording start time. However, it is also possible to simply have the association stored without the use of any offsets. In this case, supervisory unit 102 would supervise the usage status of files on PC 300 while the association creation unit 103 would process the each audio data file individually for storage. It is also possible to append the metadata of each audio data file to the corresponding files for storage.

If the audio data to be stored in storage unit 104 goes above a certain length or period of recording time or if the volume reached a certain level, smoothing can be carried out on the audio data to reduce the size for easier storage. Smoothing can be done by using the average, sum of squares, logarithm etc. of the volume over the determined interval.

In this embodiment, the duration of the audio file or audio volume is used for verification purposes. It is also possible to use the audio signal itself, in other words, some special feature to carry out the verification.

Although the information related to the setting has been shown to be files used on PC 300 during the meeting in this embodiment, it is also possible for such information to come in the form of video images recorded by a camera set up in the meeting room.

In this embodiment of the information presentation apparatus 100, it is shown that a user is able to access the files used in a meeting that he has attended by making use of the audio data recorded simultaneously by both user terminal 200 and mic 300. It is also possible for meeting minutes or additional information added to storage unit 104 after the meeting to be made accessible to the users who have attended the meeting through the use of the present invention.

There is no necessity to synchronise the local times of the user terminal 200 and the information presentation apparatus 100.

It is to be noted that although only the files that were used in the period during which the user was present have been made available to the user in this embodiment, it is also possible to let the user access all the information used in the meeting if a certain level of verification can be met to show that the user was present at some point in the meeting.

Figure 6:
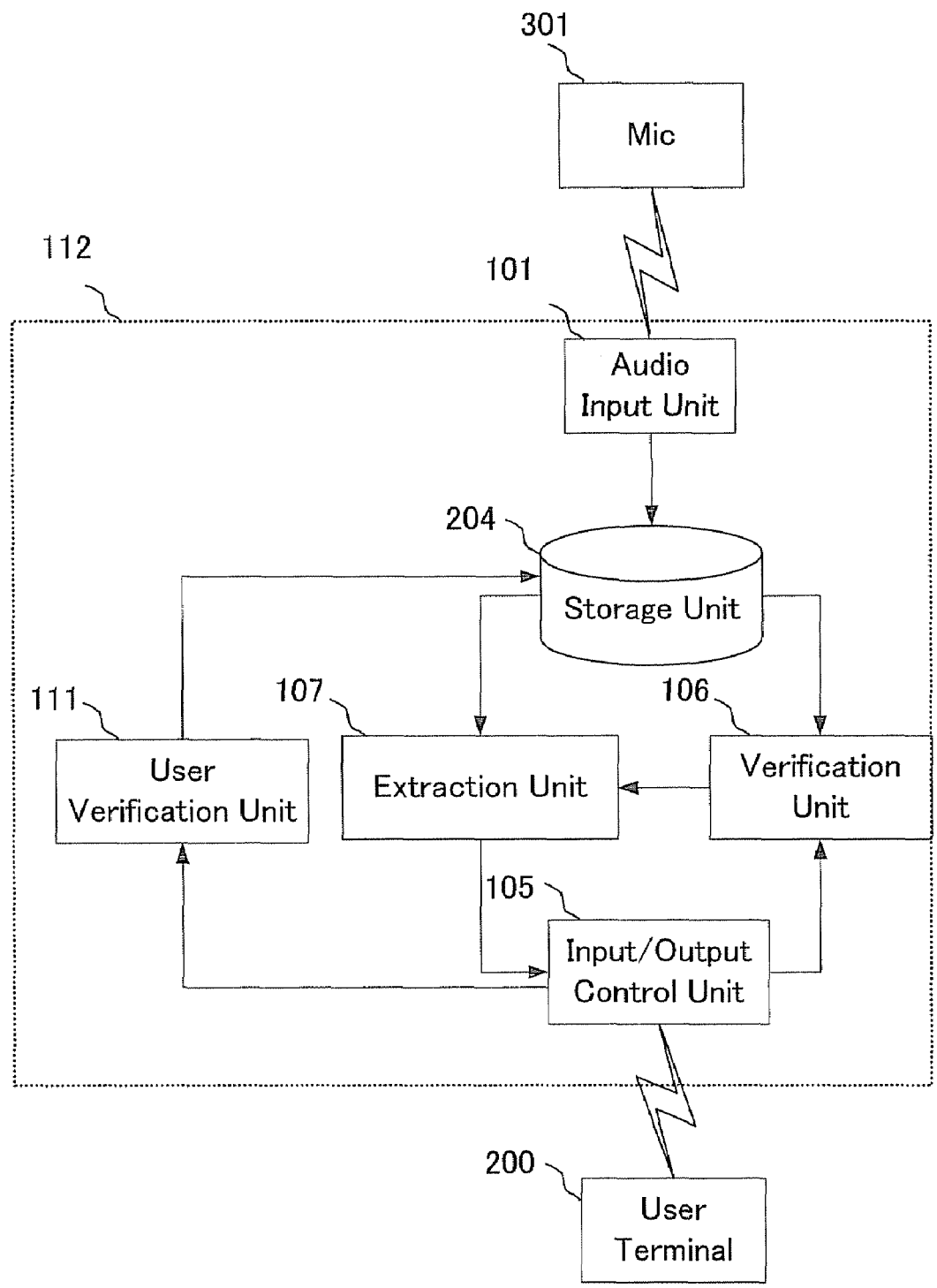
FIG. 6 is a functional block diagram illustrating a second embodiment of the information accessing apparatus of the present invention.
Figure 7:
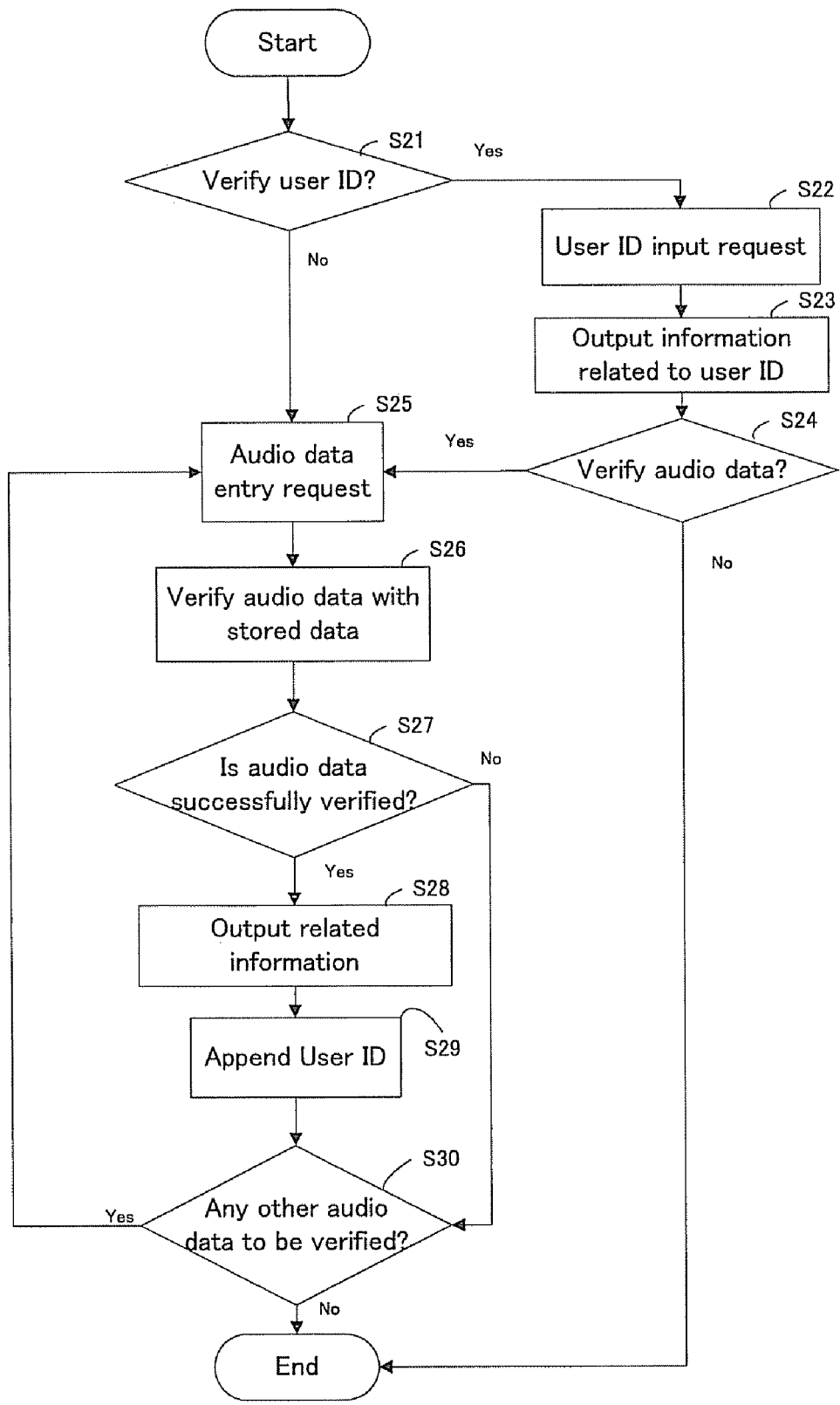
FIG. 7 is a diagram illustrating the flow of the audio data verification process as shown in FIG. 6.

FIGS. 6 to 8 describes the second embodiment of the present invention. Portions which are similar to those shown in FIG. 1 would not be described again.

The information presentation apparatus 112 of this second embodiment is geared towards entertainment purposes. In this embodiment, the settings would be places and events like event exhibition halls, live performance halls, amusement facilities etc.

As in the first embodiment, the information presentation apparatus 112 and user terminal 200 would record the audio data separately. In the event that the audio data stored in the user terminal 200 is successfully verified against the data stored in the information presentation apparatus 112, the stored data obtained from audio input unit 101 may not necessarily be taken to be data meant solely for verification purposes. As an example, such data could be taken to be special contents for users who have attended the event.

The user possessing a user terminal 200 which records the audio of an event is deemed to have attended the event. The user would then be able to obtain special contents related to the event if here were to upload the audio data recorded to information presentation apparatus 112.

FIG. 6 shows the functional block diagram of the second embodiment of the information accessing apparatus of the present invention.

In this embodiment, the information presentation apparatus 112 includes a user verification unit 111 and a storage unit 204. The user verification unit 111 attaches IDs to users after a successful verification of the audio data from user terminal 200 against the stored data in storage unit 204 is carried out and the special contents stored beforehand in storage unit 204 is outputted to user terminal 200. At this point, it is also possible to request the users to input more details. The appended user ID will be associated to the special contents and this information would be stored in storage unit 204.

FIG. 7 is a flowchart illustrating the flow of how special contents are provided to the user by the information presentation apparatus 200.

The input/output control unit 105 first checks if there is a request to verify the user's ID (S21). If such a request is present, a request is sent to the user to input his user ID (S22). The user verification unit 111 would then obtain the user ID from storage unit 204 to be used as the basis of comparison for the user ID input from the input/output control unit 105. If verification is successful, information related to the user from past verification would be output to user terminal 200 via the input/output control unit 105 (S23). This is then followed by a check to see if there is a request to verify audio data (S24). If there is audio data to be verified, the input/output control unit 105 would send out a request for the entry of audio data (S25). The verification unit 106 would then proceed to verify the audio data inputs from user terminal 200 with the stored data of storage unit 25 (S26). If the audio data is successfully verified (S27), this audio data would then be appended to the data it was verified against and the related files stored in the storage unit 204 would be outputted to user terminal 200 (S28). Also, in the event of a successful verification, the user verification unit 111 would append the user ID to the respective users (S29). The outputted special contents and the appended user ID would all be stored in storage unit 204. Finally, a check would be carried out on user terminal 200 to see if there is any other audio data to be verified (S30). If the answer is negative, the process would be ended.

FIG. 8 is an example of the special contents stored in the storage unit 204 of the information presentation apparatus 112 of the second embodiment.

Recorded audio data and the special contents meant to be provided in the event of a successful verification are associated with the user which has been successfully verified and the information is stored in storage unit 204. As shown in FIG. 8, when the audio data is successfully verified against Audio1.wav which stored in the storage unit 204, the files B.avi and C.mpg would be outputted to the user. When the audio data is successfully verified against Audio2.wav which stored in the storage unit 204, the files D.jpg and E.mpg would be outputted to the user. In this example, the user is assumed to be Ogawa and the user ID "Ogawa" is appended by step S29 of FIG. 7. This user ID "Ogawa" is then associated to B.avi, C.mpg and the events with which the audio data has been successfully verified. Thereafter, this information is stored in storage unit 204.

The storing of this information is to enable faster retrieval of files when the user accesses the information presentation apparatus 112 again. By having the user ID appended to users, the user need only input the user ID in step S22 of FIG. 7 to access the files B.avi and C.mpg. There would not be a need to verify the audio data again.

This means that through the use of the information presentation apparatus 112, the user would be able to search and retrieve files from previous sessions without the need to go through the verification process again.

Another usage of this embodiment is the easy offering of special contents to event participants if there were to be a lot of participants. In this case, pre-registration is done away with, resulting in easier management of the special content offering.

Figure 9:
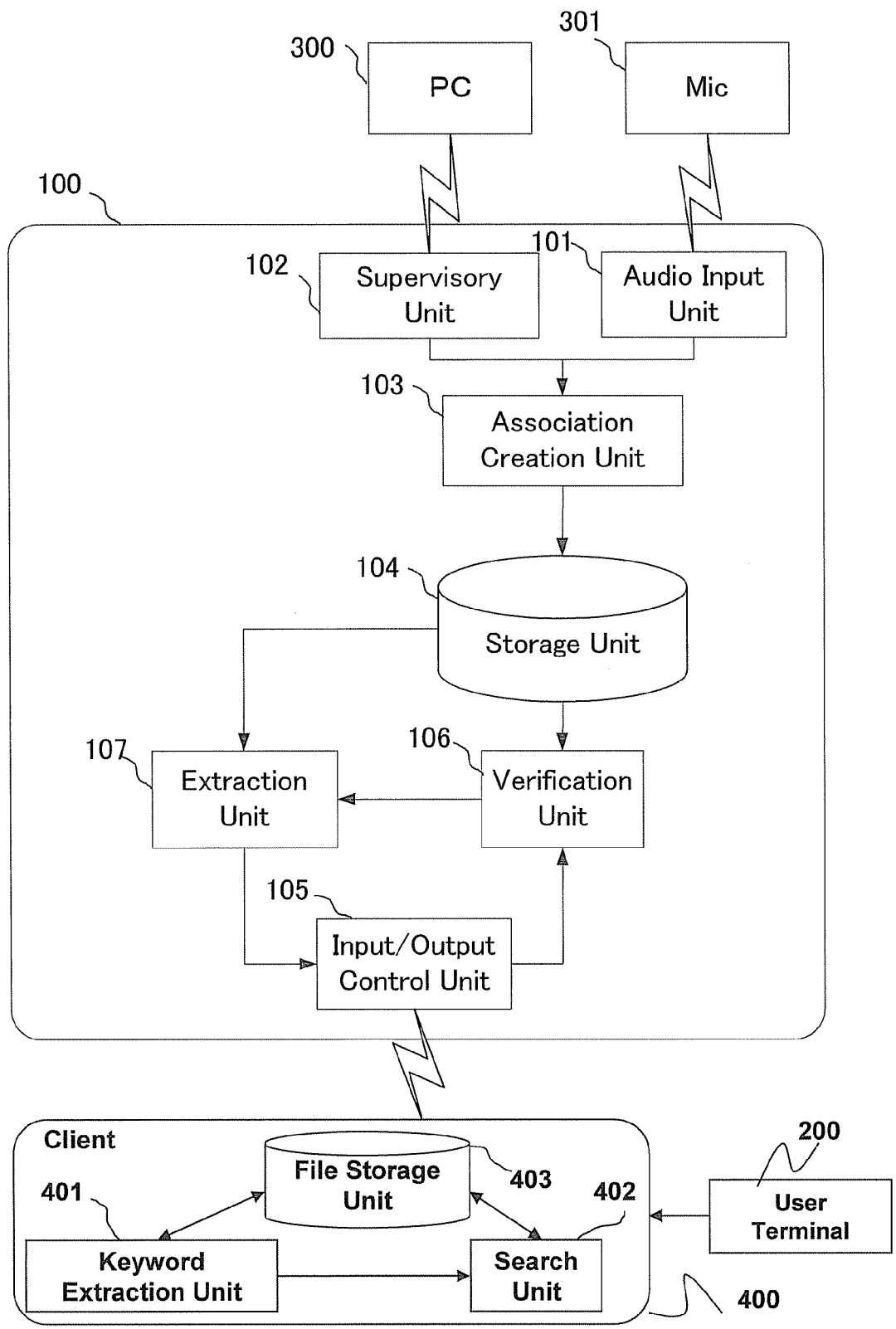
FIG. 9 is a functional block diagram illustrating a third embodiment of the information accessing apparatus of the present invention.

FIGS. 9 to 8 describes the second embodiment of the present invention. Portions which are similar to those shown in FIG. 1 would not be described again.

FIG. 9 shows the functional block diagram of the third embodiment of the information accessing apparatus of the present invention. Although it is essentially the same as the information presentation apparatus shown in FIG. 1, a client 400 is added. A keyword extraction unit 401, a search unit 402 and a file storage unit 403 is also added and they are encompassed in client 400. It is also possible to consider the information presentation apparatus 100 as a server. Client 400 receives the recorded audio data from user terminal 200 and sends it on to the information presentation apparatus 100. Files would be sent from storage unit 1-4 to client 400 via the input/output control unit 105. The sent files would be stored as downloaded files in the file storage unit 403. The keyword extraction unit then extracts keywords from the files and sends them on to the search unit 402. Search unit 402 then conducts a search on all the files stored in the file storage unit 403 based on the received keyword. In this example, although the client 400 and user terminal 200 are represented as two separate blocks, it is also possible for the user terminal 200 to be part of the client 400.

Figure 10:
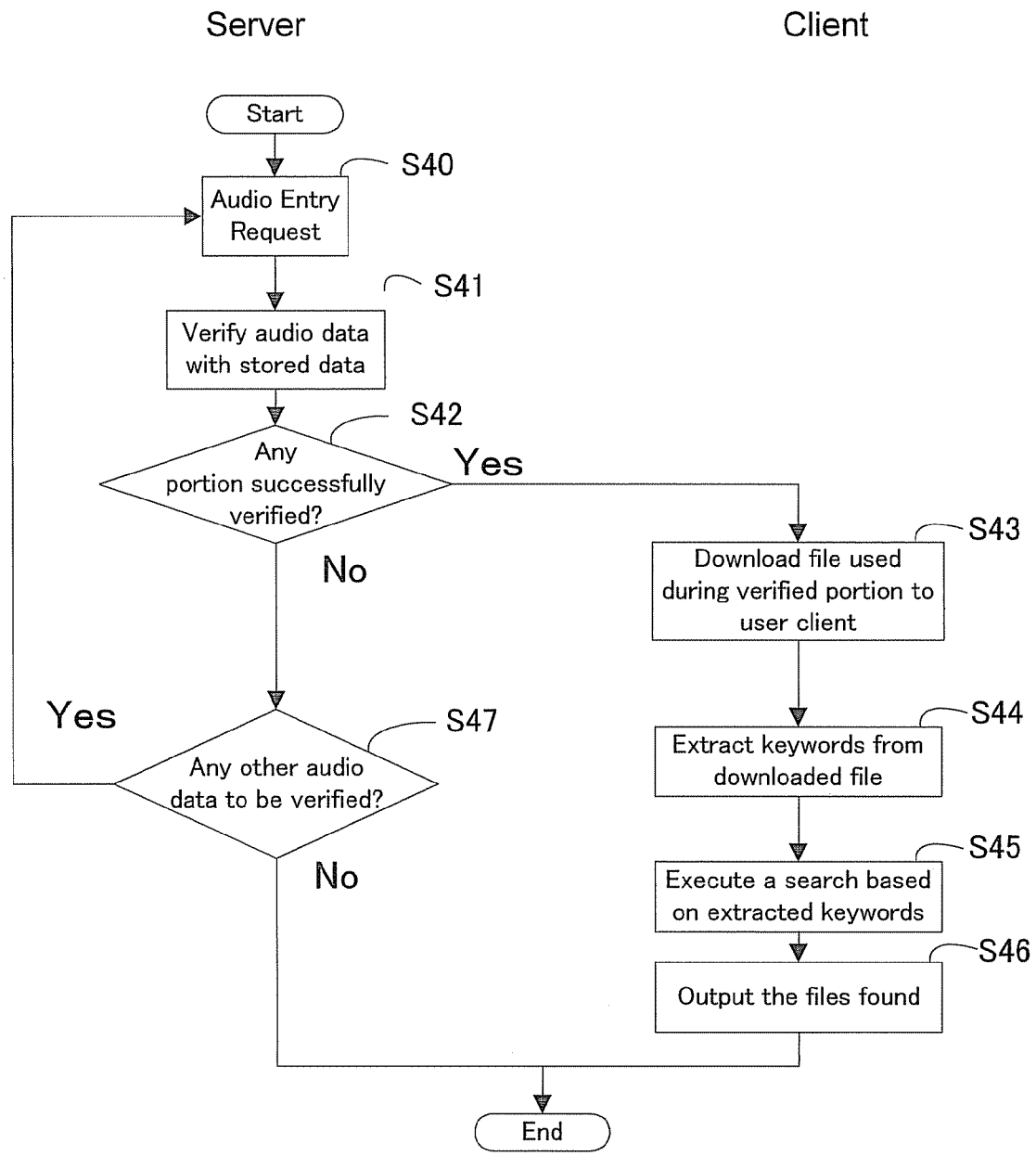
FIG. 10 is a diagram illustrating the overall flow of the file access process as shown in FIG. 9.

FIG. 10 is a flowchart illustrating the flow of how the files associated to the stored data, which has been verified with the input audio data, is outputted.

Input/output control unit 105 would first request for audio data awaiting verification to be sent from client 400 (S40). Verification unit 106 would then proceed to verify the received audio data with the stored data of storage unit 104 (S41). A check would then be carried out to see if there is audio data with portions that are successfully verified with the stored data (S42). If such portions exist, the corresponding local time of the portion that has been verified would be calculated. The extraction unit 107 would then proceed to extract the addresses of files which have been associated to the successfully verified period. Users would then be able to download these files to client 400 (S43). The downloaded files would be stored in the file storage unit 403 whereupon the keyword extraction unit 401 would extract keywords from them (S44). Some known examples of the keyword extraction methods would be natural language processing methods like morpheme analysis, named entity extraction. Next, search unit 402 would execute a search on file storage unit 403 based on the extracted keywords (S45). Files with the keywords found in them would be outputted to the user in the form of a list and the process would be ended (S46). The order of the list can be based on the number of occurrences of the keywords, the number of different keywords or chronological information. If there is no audio data with portions that are successfully verified with the stored data, then a check would be carried out to see if there is any other audio data to be verified (S47). If there is any other audio data to be verified in client 400 or user terminal 200, another request for audio data would be made. If no audio data to be verified is found, the process would be ended.

Figure 11:
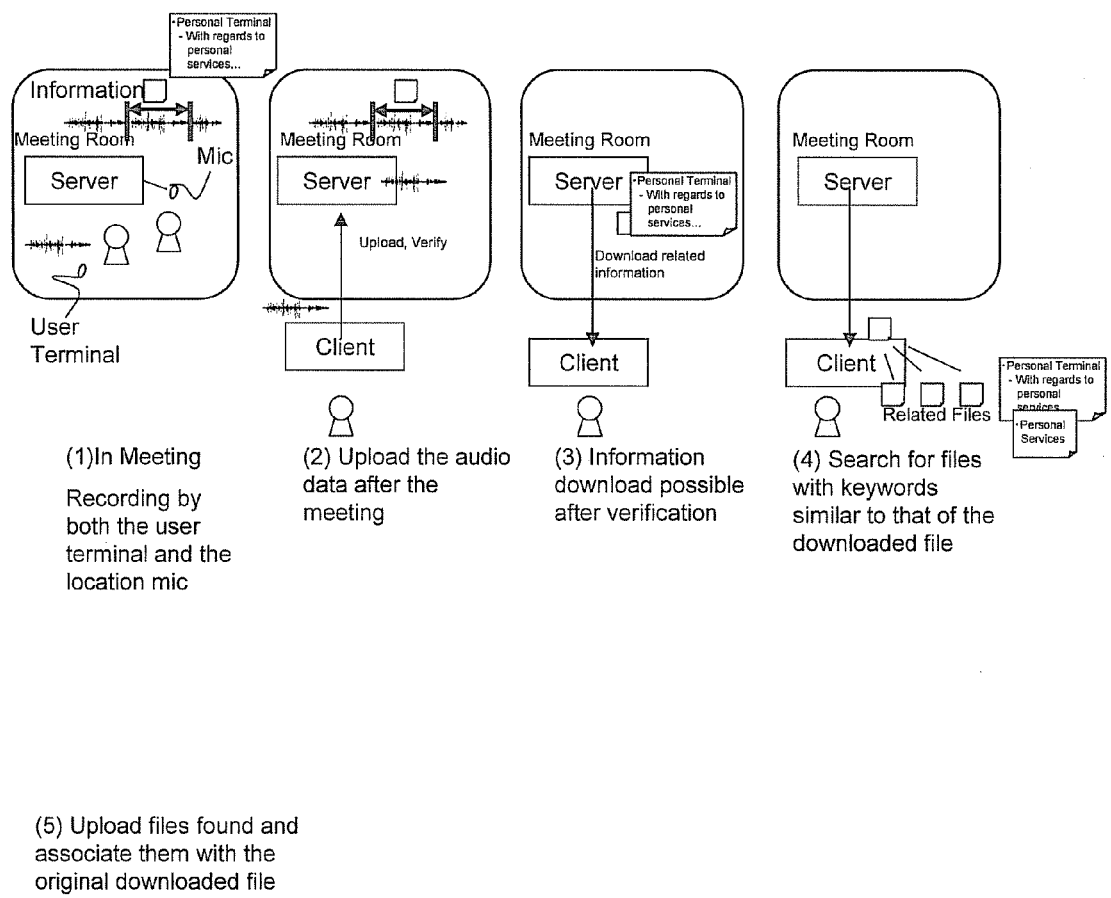
FIG. 11 is a diagram illustrating a first usage of the information accessing apparatus as shown in FIG. 9.

FIG. 11 is an example of a first actual implementation of the third embodiment.

As shown in FIG. 11(1), users attending the meeting are all in possession of individual user terminals. In the midst of the meeting, the mic located in the meeting room as well as the mics on the user terminals would be recording the proceedings of the meeting. This includes all sounds and conversations. The information and files used during the meeting would all be stored on the server. As seen in FIG. 11(2), each user would return to his individual workplaces after the meeting ends or when he leaves the meeting. The user would then access the server through a network. At this point in time, the audio data recorded by user terminal 200 would be sent to client 400 and in turn, client 400 would upload this audio data to the server for verification. This is to confirm the attendance of the user at the meeting or event. In this example, the user's audio file only consists of a certain portion of the meeting proceedings while the stored data on the server would contain the entire meeting's proceedings. FIG. 11(3) shows the successful verification of the audio data with the stored data. The time period during which the user was present is also obtained and the user would be able to download the information pertaining to this time period. As seen in FIG. 11(4), the downloaded file would be saved in the file storage unit 403. The keyword extraction unit 401 would then extract keywords from the downloaded file and send them on to search unit 402. Search unit 402 would then search file storage unit 403 for any files which might be related to the downloaded file and display them to the user. As seen in FIG. 11(5), the user can then choose certain related files which have been found for uploading to the server. These files would then be associated to the originally downloaded file as well as the meeting during which the originally downloaded file was used.

FIG. 12 shows an example of the information stored in storage unit 104.

The audio data recorded by mic 301 and obtained by audio input unit 101 is stored in storage unit 104. In this example, Meeting1.wav is the audio data file stored. The file name of the audio data can be created by the association creation unit 103. The recording time of the audio data is also saved and associated to the meeting audio data. The files used during the recording period of Meeting1.wav is also saved along with its' usage start times and usage end times. For example, Project Progress.ppt was used on PC 300 from 20070204 12:00:00 to 20070204 13:03:43. Any user with audio data that can be successfully verified against Meeting1.wav for the time period of 20070204 12:00:00 to 20070204 13:03:43 would be able to download Project Progress.ppt to client 400.

Figure 13:
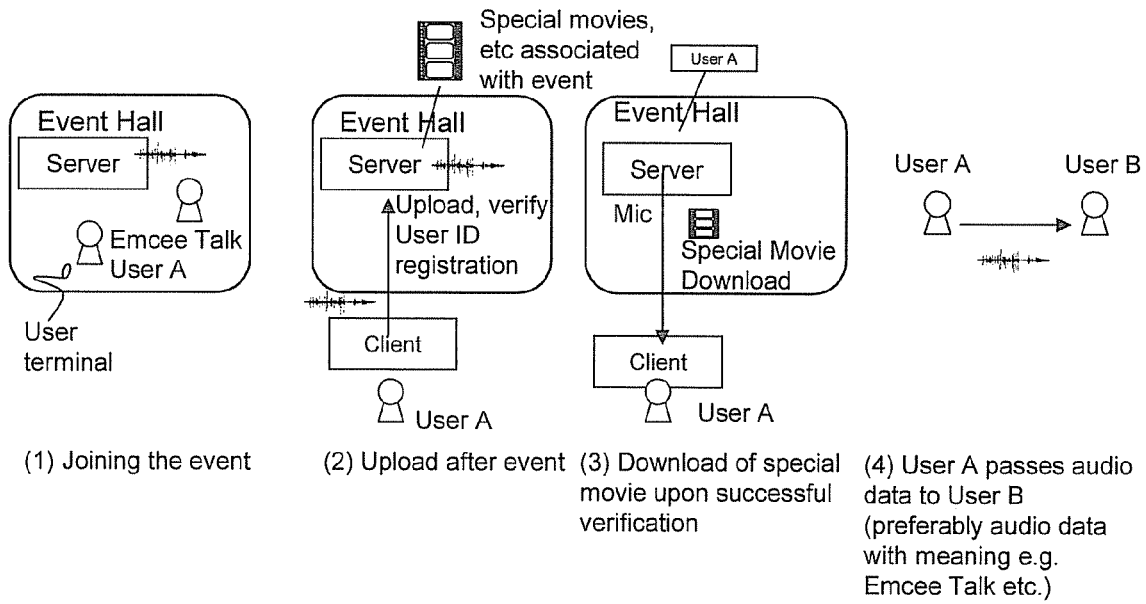
FIG. 13 is a diagram illustrating a second usage of the information accessing apparatus as shown in FIG. 9.
Figure 13:
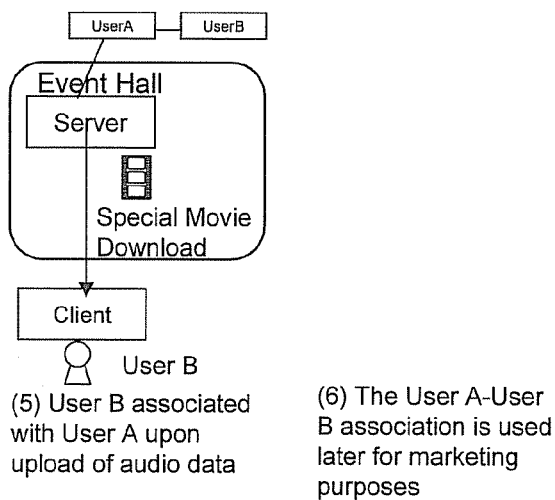

FIG. 13 is an example of a second actual implementation of the third embodiment.

FIG. 13(1) shows a user A attending an event for the purposes of obtaining special contents related to the event. User A would be in possession of a user terminal 200. During the event, user A would record the proceedings (including the emcee's talk), with the user terminal 200 while a mic in the event hall would be recording the same proceedings simultaneously. In FIG. 13(2), we see user A in some other location after the event, trying to access the server through a network via the use of a client 400. Once the server is accessed, the user would then proceed to register for a user ID or login in to a user account using any user ID that has been registered earlier. The recorded audio data would then be uploaded to the server. This uploaded audio data would then be verified against the data recorded by the mic in the event hall and stored within storage unit 104 to determine if the user was present at the event. As seen in FIG. 13(3), if the verification is successful and the user is deemed to have been at the event, information related to the event like special video and audio contents stored within storage unit 104 would be made available for download. Next, user A would hand the audio data recorded by the user terminal 200 to user B as shown in FIG. 13(4). In this instance, audio data which possess some form of speech or meaning e.g. emcee's talk, etc. would be preferred. In FIG. 13(5), user B would do what user A did and upload the audio data to the server via the client. By doing so, user B would be able to download the same special video and audio contents as user A. However, as this audio data is an exact same copy of the audio data uploaded by user A, the server would be able to detect this fact. As shown in FIG. 13(5), user B would be associated to user A and a link would be created between them and stored in the storage unit 104. This link is created as user B is deemed to have been introduced by user A. Such links are meant to be used for promotional purposes at a later stage. For example, if user A were to access information from some other event on the server or upload another piece of audio data from another event, a message would be sent to user B to introduce that newly accessed event and vice versa.

FIG. 14 shows an example of the audio data and special content files stored in the storage unit 104.

Audio data from events, files and data to be outputted to users upon successful verification and successfully verified user information would be stored in storage unit 104. As shown in FIG. 14, Special1.avi and Special2.mpg would be made available to the user who successfully verifies against Emceeintro.wav which is stored in storage unit 104. Special3.jpg and Special4.mpg would be made available to the user who successfully verifies against Eventintro.wav which is stored in storage unit 104. Also, if the audio data stored in user A's client 400 is successfully verified against Emceeinto.wav, user A would be deemed to have participated in the event. Upon this confirmation, user A would be able to download Special1.avi and Special2.mpg. After user A has downloaded Special1.avi and Special2.mpg, associations would be created between the files and the user ID that is user A for storage in storage unit 104.

FIG. 15 shows the information stored in storage unit 104 after user A passes the audio data to user B and user B accesses the server.

User B accesses the server and successfully verifies the audio data. After verification is complete, user B downloads Special1.avi and Special2.mpg. As this audio data is an exact dead copy of the audio data used by user A, it is deemed to be user A's audio data and user B is associated to user A. The user ID UserA-UserB is then created and stored in storage unit 104.

Although the above embodiments show the processing as being carried out in the server by the information presentation apparatus 100, it is also possible to have PC 300 and information presentation apparatus as one combined apparatus. Information presentation apparatus 100 can also be a normal computer with components like a control device like CPUs, memory devices like ROMs and RAMs, external storage devices like HDDs, display devices and input devices like keyboards and mice.

It is also possible to realise the above invention using the standard hardware found in computers on the mass market today. The execution of the programs would be carried out by the modules possessing the above listed capabilities. The program can be in the form of either installable files or executable files stored on computer-readable media like CD-ROMs, floppy disks, CD-Rs, DVDs, etc. It can also be preinstalled on memory modules like ROMs.

What is claimed is:

1. An information presentation apparatus, comprising:
a storage unit which stores a first audio data recorded by a first device from a certain setting during a certain time period as well as the information related to the setting;
an input unit to input a second audio data recorded by a second device during the certain time period;
an audio data verification unit which verifies whether the second audio data contains a part of the first audio data and considers whether the first device and the second device are located in the same location when the first audio data and the second audio data are recorded;
an extraction unit which extracts the information related to the setting associated to the portion of the first audio data if the second audio data is successfully verified against a portion of the first audio data;
an output unit which outputs the information extracted by the extraction unit to the user.

2. The apparatus according to claim 1, wherein:
said storage unit appends a first chronological information to the first audio data and a second chronological information to the information related to the setting;
said extraction unit extracts the information appended with the second chronological information which is associated with the portion of the first audio data which is appended with the first chronological information when the second audio data is successfully verified with a portion of the first audio data.

3. The apparatus according to claim 2, further comprising:
a first detection unit which supervises a computer used in the setting and detects information which has been used on the computer;
a second detection unit which detects and collects the first audio data from the setting; wherein
said storage unit stores the first audio data and the information detected by the first and second detection means.

4. The apparatus according to claim 1, further comprising:
an ID designation unit which designates an ID to the user when the second audio data is successfully verified against a portion of the first audio data;
an ID storage unit which creates and stores the association between the extracted information by the extraction means, the ID and the user;
an ID input unit to input the ID;
a user verification unit which verifies the ID inputted from the ID input unit with the ID stored by the ID storage unit; wherein
the extraction unit extracts the information associated with the ID if the verification by the user verification unit is successful.

5. The apparatus according to claim 1, further comprising:
an audio output unit which outputs a third audio data in the setting based on a fixed cycle;
a synchronisation unit which extracts the third audio data associated to the first audio data and the second audio data, and synchronises the time during which second audio data starts recording the third audio data with the time during which the third audio data is outputted; wherein
the verification unit verifies the second audio data which has been synchronised by the synchronisation unit with the first audio data to determine if it contains a portion of the first audio data.

6. The apparatus according to claim 5, wherein the third audio data outputted by said audio output unit is audio data with audio characteristic appended in the form of chronological information associated with the output time.

7. An information presentation method, comprising:
storing a first audio data recorded by a first device from a certain setting during a certain time period as well as the information related to the setting;
inputting a second audio data recorded by a second device during the certain time period;
verifying whether the second audio data contains a part of the first audio data, wherein the verifying comprises considering whether the first device and the second device are located in the same location when the first audio data and the second audio data are recorded;
extracting the information related to the setting associated to the portion of the first audio data if the second audio data is successfully verified against a portion of the first audio data;
outputting the extracted information to the user.

8. The apparatus according to claim 1, further comprising
a keyword extraction unit which extract keywords from text data which is included in information related to the setting;
a search unit which searches information possessed by the user based on the extracted keyword; wherein
said output unit outputs information found by the search unit to the user.

9. The apparatus according to claim 4, further comprising
an audio similarity verification unit which verifies if the second audio data is entirely similar to an earlier verified second audio data if the verification of the second audio data with a portion of the first audio data is successful; wherein
said ID storage unit stores the association of user IDs which have uploaded the same audio data.

10. The apparatus according to claim 1, wherein the first device and the second device are positioned in a similar location during the certain time period.

11. The apparatus according to claim 1, wherein the first device and the second device are positioned in different locations during the certain time period.

12. An information presentation method, comprising:
storing a first audio data recorded by a first device from a certain setting during a certain time period as well as the information related to the setting;
inputting a second audio data recorded by a second device during the certain time period;
verifying whether the second audio data contains a part of the first audio data, wherein the verifying comprises considering whether the first device and the second device are located in different locations when the first audio data and the second audio data are recorded;
extracting the information related to the setting associated to the portion of the first audio data if the second audio data is successfully verified against a portion of the first audio data; and
outputting the extracted information to the user.

13. The method according to claim 12, wherein the extracting comprises extracting keywords from text data which is included in information related to the setting, the method further comprising:
searching information possessed by the user based on the extracted keyword, wherein the outputting comprises outputting information found by the search unit to the user.

14. The method according to claim 12, further comprising:
designating an ID to the user when the second audio data is successfully verified against a portion of the first audio data;
creating and storing the association between the extracted information, the ID, and the user;
inputting the ID;
verifying the ID inputted with the ID stored, wherein the extracting comprises extracting the information associated with the ID if the verification is successful;
verifying if the second audio data is entirely similar to an earlier verified second audio data if the verification of the second audio data with a portion of the first audio data is successful; and
storing the association of user IDs which have uploaded the same audio data.

15. The method according to claim 12, further comprising positioning the first device and the second device in a similar location during the certain time period.

16. The method according to claim 12, further comprising positioning the first device and the second device in different locations during the certain time period.

17. An information presentation apparatus, comprising:
a storage unit which stores a first audio data recorded by a first device from a certain setting during a certain time period as well as the information related to the setting;
an input unit to input a second audio data recorded by a second device during the certain time period;
an audio data verification unit which verifies whether the second audio data contains a part of the first audio data and considers whether the first device and the second device are located in different locations when the first audio data and the second audio data are recorded;
an extraction unit which extracts the information related to the setting associated to the portion of the first audio data if the second audio data is successfully verified against a portion of the first audio data; and
an output unit which outputs the information extracted by the extraction unit to the user.

18. The apparatus according to claim 17, further comprising
a keyword extraction unit which extract keywords from text data which is included in information related to the setting;
a search unit which searches information possessed by the user based on the extracted keyword; wherein
the output unit outputs information found by the search unit to the user.

19. The apparatus according to claim 17, further comprising
an ID designation unit which designates an ID to the user when the second audio data is successfully verified against a portion of the first audio data;
an ID storage unit which creates and stores the association between the extracted information by the extraction means, the ID and the user;
an ID input unit to input the ID;
a user verification unit which verifies the ID inputted from the ID input unit with the ID stored by the ID storage unit, wherein the extraction unit extracts the information associated with the ID if the verification by the user verification unit is successful; and
an audio similarity verification unit which verifies if the second audio data is entirely similar to an earlier verified second audio data if the verification of the second audio data with a portion of the first audio data is successful, wherein the ID storage unit stores the association of user IDs which have uploaded the same audio data.

20. The apparatus according to claim 17, wherein the first device and the second device are positioned in a similar location during the certain time period.

21. The apparatus according to claim 17, wherein the first device and the second device are positioned in different locations during the certain time period.

* * * * *